(12) United States Patent
Karaoglu et al.

(10) Patent No.: US 6,299,968 B1
(45) Date of Patent: Oct. 9, 2001

(54) GENERAL PURPOSE MULTILAYER FILM PRODUCTS

(75) Inventors: Azmi Karaoglu, Wayne, NJ (US); Dennis J. Kalz; William J. Donohue, Jr., both of Danville, VA (US); Debra H. Tickle, Keeling, VA (US)

(73) Assignee: Intertape Inc., Danville, VA (US)

( * ) Notice: Subject to any disclaimer, the term of this patent is extended or adjusted under 35 U.S.C. 154(b) by 0 days.

(21) Appl. No.: 09/580,678

(22) Filed: May 30, 2000

Related U.S. Application Data

(60) Provisional application No. 60/166,689, filed on Nov. 20, 1999.

(51) Int. Cl.$^7$ .............................. B32B 7/02; B32B 27/32
(52) U.S. Cl. ......................... 428/213; 428/515; 428/516
(58) Field of Search ................................ 428/515, 516, 428/354, 355

(56) References Cited

U.S. PATENT DOCUMENTS

| | | | |
|---|---|---|---|
| 3,645,992 | * 2/1972 | Elston | 526/169.2 |
| 4,833,024 | 5/1989 | Mueller | 428/349 |
| 4,865,902 | 9/1989 | Golike et al. | 428/215 |
| 5,023,143 | 6/1991 | Nelson | 428/516 |
| 5,158,836 | * 10/1992 | Schirmer et al. | 428/336 |
| 5,175,049 | * 12/1992 | Huff et al. | 428/218 |
| 5,273,809 | * 12/1993 | Simmons | 428/212 |
| 5,749,202 | * 5/1998 | Eicbauer | 53/399 |
| 5,902,684 | 5/1999 | Bullard et al. | 428/515 |
| 5,907,942 | 6/1999 | Eichbauer | 53/441 |
| 5,907,943 | 6/1999 | Eichbauer | 53/441 |
| 5,942,236 | * 8/1999 | Ecoff | 428/341 |
| 5,998,017 | * 12/1999 | Eichbauer | 428/343 |

* cited by examiner

Primary Examiner—Harold Pyon
Assistant Examiner—Elena Tsoy
(74) Attorney, Agent, or Firm—Roberts Abokhair & Mardula, LLC

(57) ABSTRACT

The present invention provides improved multi-layer general purpose stretch film products. The products comprise at least a core layer, adjacent inner layers and outer layers. The outer layers represent from 8 to 25 percent by weight of the film and comprise a blend of a linear low density polyethylene, a metallocenes catalyzed linear low density polyethylene, and a flexible very low density polyethylene. The inner layers represent from 15 to 35 percent by weight of the film and comprise a blend of linear low density polyethylene and a metallocenes eatalyzed linear low density polyethylene. The core layer represents from 15 to 35 percent by weight of the film and comprises linear low density polyethylene. The linear low density polyethylene components are either single products or blends of products. The final film exhibits improved properties needed in stretch wrap films such as puncture resistance and load retention.

14 Claims, No Drawings

GENERAL PURPOSE MULTILAYER FILM PRODUCTS

RELATED APPLICATIONS

This application claims priority from provisional patent application Ser. No. 60/166,689 filed on Nov. 20, 1999, by Azmi Karaoglu (Kay). The provisional application is incorporated herein by reference, in its entirety, for all purposes.

BACKGROUND

The present invention is directed to stretch wrap films and methods for their use. In particular, the present invention is directed to stretch wrap films having excellent maximum stretch, moderate holding force, superior puncture resistance, high total energy dart drop, high cling force and overall strength.

The use of thermoplastic stretch wrap films for the overwrap packaging of goods, and in particular, the unitizing of palleted loads is a significant commercially important application of polymer film, including generically, polyethylene and other polyolefins.

Over-wrapping a plurality of articles to provide a unitized load can be achieved by a variety of techniques. In one procedure, the load to be wrapped is positioned on a platform, or turntable, which is made to rotate and in so doing, to take up stretch wrap film supplied from a continuous roll. Braking tension is applied to the film roll so that the film is continuously subjected to a stretching or tensioning force as it wraps around the rotating load in overlapping layers. Generally, the stretch wrap film is supplied from a vertically arranged roll positioned adjacent to the rotating pallet load. Rotational speeds of from about 5 to about 50 revolutions per minute are common.

At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods.

Another wrapping method finding acceptance in industry today is that of hand wrapping. In this method, the film is again arranged on a roll, however, it is hand held by the operator who walks around the goods to be wrapped, applying the film to the goods. The operator may install the roll of film so used on a hand-held wrapping tool for ease of use.

Some of the properties desired of a good stretch wrap film are as follows: good cling or cohesion properties, high puncture resistance, good machine direction tear resistance, good transparency, low haze, low stress relaxation with time, high resistance to transverse tear especially when under machine direction tension, producible in thin gauges, low specific gravity and thus high yield in area per pound, good tensile toughness, high machine direction ultimate tensile strength, high machine direction ultimate elongation, and low modulus of elasticity.

Currently, different grades of stretch wrap films are commonly marketed for different end uses according to overall film properties. For example, certain stretch wrap films have superior properties for load retention, but these films are characterized by having poor stretching characteristics. On the other hand, certain stretch wrap films having superior stretching properties have low load retention properties, thus limiting their use. Some of the broader categories include: general purpose stretch films, premium or heavy duty stretch films, single sided cling films, general purpose hand wrap films, heavy duty hand wrap films, and special formulation hand wrap films.

A need exists to develop superior general purpose stretch wrap films characterized by having moderate load retention characteristics and excellent stretching characteristics while still maintaining other important stretch film properties. Such films could be used in a wider variety of end applications and, thus, not unduly limit users of stretch wrap films to selectively choosing a film based on its properties prior to initiating a stretch wrap application.

Accordingly, the present invention provides for multilayer films for general purpose stretch applications including stretch wrap films. The preferred resultant film has five layers with each layer being a single component or blended components to achieve the desired improved results.

In accordance with the present invention, attention has been focused on developing higher performance stretch films, while maintaining cost efficient production capabilities. Performance enhancements include improvement of load retention, tear resistance in machine direction (MD) and transverse direction (TD), puncture resistance, ultimate elongation, and overall strength. Desired properties of a "good" stretch film are good cling or cohesion properties, good tear resistance in MD and TD directions, good clarity (low haze), high ultimate elongation, high tensile values, good stiffness (modulus), and high yield per pound.

SUMMARY

The present invention is a co-extruded film comprised of a 5-layer construction that is used for cling/cling film applications or general purpose stretch film applications. In one embodiment, these multi-layer stretch wrap films are manufactured as cast films with conventional co-extrusion methods. Each of the five layers comprises a single polyolefin polymer or a mixture of polymers. When a mixture of polymers is utilized in a single layer, the polymers are introduced into an extruder to be mixed and extruded as a single layer. Cling/cling or general purpose stretch film application construction comprises the utilization of five layers of the following compositions. The outer layers comprise linear low density polyethylene (LLDPE), metallocene based linear low density polyethylene (mLLDPE), and a Flexomer. These outer layers are present in the final film product in amounts ranging from 8 to 25 percent by weight each. The inner layers (not the core layer) comprise LLDPE, mLLDPE, and low density polyethylene (LDPE). Each of the inner layers represents from about 15 to about 35 percent by weight of the total film. The core layer comprises LLDPE and is present in an amount from 15 to 30 percent by weight of the final film product.

DETAILED DESCRIPTION

The film products of the present invention provide improved general-purpose stretch film for load containment or product protection. These films are usually manufactured in a cast film process and cover a wide range of applications. The applications include general load unitization, use on high-speed automatic stretch wrapping equipment, cool warehouse or "cold room" applications, long-range load hauling, and bar code scanning applications. The films of the present invention provide products with quiet unwind characteristics and effective load containment over a wide range of prestretch levels.

In one embodiment of the present invention, the film comprises five layers where each of the five layers comprises a single polyolefin polymer or a mixture of polymers as shown in the table below. When a mixture of polymers is utilized in a single layer, the polymers are introduced into an extruder to be mixed and extruded as a single layer. Cling/cling or general purpose stretch film application construction comprises the utilization of five layers of the following compositions. The outer layers comprise linear low density polyethylene (LLDPE), metallocene based linear low density polyethylene (mLLDPE), and a Flexomer®. These outer layers are present in the final film product in amounts ranging from 8 to 25 percent by weight each. The inner layers (not the core layer) comprise LLDPE, mLLDPE, and low density polyethylene (LDPE). Each of the inner layers represents from about 15 to about 35 percent by weight of the total film. The core layer comprises LLDPE and is present in an amount from 15 to 30 percent by weight of the final film product.

TABLE I

| Layer | Amount (wt %) | Make-up |
| --- | --- | --- |
| A | 8%–25% | LLDPE, mLLDPE. Flexomer |
| B | 15%–35% | LLDPE, LDPE, mLLDPE |
| C | 15%–35% | LLDPE |
| B | 15%–35% | LLDPE, LDPE, mLLDPE |
| A or D | 8%–25% | LLDPE, mLLDPE, Flexomer |

In one embodiment of the invention, the outer layer A comprises a blend of LLDPE, mLLDPE and Flexomer(®) products. Suitable LLDPE products are hexene copolymers having a density of from 0.915 to 0.9198 grams per cubic centimeter (g/cm$^3$) and a melt index of 1.5 to 2.5 (g/10 min.). Most preferably, the LLDPE product has a melt index or from 1.72 to 2.28 g/10 min. and a density of 0.916 to 0.918. The LLDPE is present in amounts ranging from 20 to 60 percent by weight and preferably from 35 to 45 percent. Such products are available from various vendors including Exxon Chemical (Escorene® LL-3002) and Union Carbide Corporation (Tufling® HS-7002). These products are utilized in the blend of the outer layer to provide good tensile properties as well as stiffness and toughness to the resulting film product.

The Flexomer products are available from Union Carbide Corporation. These products are softer polyethylene products and provide resiliency and impact strength. It is believed that these products are polyethylene blends of 1-butene and 1-hexene copolymers. These products exhibit a narrower molecular weight distribution. Suitable products include the product ETS-9078 available from Union Carbide. The preferred products for this component exhibit densities from about 0.907 to about 0.913 g/cm$^3$ and a melt index of from about 2.0 to 3.0 g/10 min. Most preferred are products having a density of from 0.908 to 0.9125 and a melt index from 2.15 to 2.85 g/10 min. The Flexomer products or equivalent soft polyethylene products are added to the blend of the outer layer in amounts from 10 to 30 percent by weight and preferably in amounts from 15 to 20 percent by weight. These products exhibit narrow molecular weight distribution and provide good draw-down properties and produce low modulus films with high clarity and balance of toughness and stiffness. This product imparts resiliency, impact strength and puncture resistance to the final film.

The mLLDPE products are known in the art as the products made with a new generation of catalysts known as metallocenes. Methods of manufacturing these products will be discussed below. These products are available from various vendors, including Exxon Chemical (Exxon) and Dow Chemical Company (Dow). Suitable mLLDPE products for blending in the outer layers include those products having a density of 0.910 to 0.918 g/cc and a melt index of from about 3.0 to 4.0 g/10 min. Preferably, the mLLDPE products have a density of 0.913 to 0.9168 g/cc and a melt index of from about 3.01 to 3.99 g/10 min. Suitable products within the required parameters include octene copolymers. For example, Dow Elite 5220 is a suitable product exhibiting a density of 0.9150 g/cc and a melt index of 3.5 g/10 min. with a DSC melting point of 252° F. (122° C.). The MLLDPE component is present in amounts ranging from 25–65 percent by weight with 35–50 % being preferred and 40–45% being most preferred.

The inner layers, shown as layers B in the table above, comprise a blend of LLDPE and mLLDPE. Each of the inner layers B represents about 15 to 35 percent by weight of the total film. Most preferably, each of the inner layers represents 25–32.5 % by weight of the total film.

The LLDPE component may be the same LLDPE component of the outer layer A. In a preferred embodiment, the LLDPE component is a blend of two LLDPE products. The first LLDPE product (B-LLDPE-1) is selected from the same group of the LLDPE products of the outer layer A and is present in an amount of from 20 to 40% by weight of the inner layer. Preferably, this component is present in an amount of from 30–35 % by weight. The second LLDPE component (B-LLDPE-2) is selected from the group of LLDPE octene copolymers having the same density range and a slightly higher melt index than B-LLDPE-1 products. The melt index for this B-LLDPE-2 component is from 1.8 to 2.8 g/10 min., preferably from 2.0 to 2.6 g/10 min. The density range is preferably from 0.915 to 0.919 g/cc. Such LLDPE-2 products are available from various vendors including products sold by Dow, such as Dowlex NG 3347A products. Dow provides these products with a target melt index of 2.3 g/10 min. and an annealed density of 0.917 g/cc. This component is preferably present in an amount representing 35 to 60 percent by weight of the inner layer, most preferably from 45 to 52 percent by weight. This component provides the ultimate film with good extensibility and increased resistance to failure around film flaws with good puncture resistance and load retention.

The mLLDPE of the inner layers is selected from the same group of mLLDPE products suitable for the outer layers. This component can be the same as or a different product than used in the outer layers. For ease of handling and storage, it is preferred that the mLLDPE component is the same for the each of the outer layers and inner layers. The mLLDPE component makes up the remainder of the composition of the inner layer and is present in an amount ranging from 10 to 30 percent by weight, preferably 15 to 25 percent by weight. In all the discussions herein, an inner layer is to be distinguished from the core layer. In the table above, layers B are the inner layers while layer C is the core layer.

The core layer comprises LLDPE selected from the products suitable for use in the outer layers. In a preferred embodiment, the core layer comprises a blend of at least two LLDPE products. The first LLDPE component (C-LLDPE-1) is selected from the group of LLDPE products used in the outer layer. The second LLDPE component (C-LLDPE-2) for the core layer is selected from LLDPE products that are butene copolymers. Preferably, such products have a melt index of from 1.5 to 2.5 g/10 min. and a density of from about 0.916 to 0.9198. Such products are available from various vendors. For example, Exxon product Escorene LL-1002 is suitable for this application. This product has a target melt index of 2.0 g/10 min., density of 0.918 g/cc and a melting point of 249° F (1210 C.). The mixture comprises from about 10 to 90 percent by weight of C-LLDPE-1 and from 10 to 90 percent by weight of C-LLDPE-2. In one preferred embodiment the two components are present in a 60/40 mixture of C-LLDPE-2/ C-LLDPE-1. The core layer represents from 15 to 35, preferably from 20 to 30, percent by weight of the total film.

In the five layer film construction, in accordance with an embodiment of the present invention, the outer layers can be the same or different. When the outer layers are the same, the layer designation is shown as A-B-C-B-A. This also shows that the inner layers B are the same. Alternatively, the outer layers may be different with the layer designation shown as A-B-C-B-D. Layer D can vary but is preferably an LLDPE layer. The composition comprises an LLDPE selected from the same group of products suitable for use in outer layer A.

In another embodiment of the present invention, layers B may be the same or different. Layers B may be different but preferably should comprise the same types of components. In such a case film designation is A-$B_1$-C-$B_2$-A or A-$B_1$-C-$B_2$-D. In yet another preferred embodiment, the same LLDPE component is uses in all layers. In another preferred embodiment, each layer comprises from 20 to 45 percent by weight of the same LLDPE component.

In one embodiment of the present invention, the co-extruded film structure is manufactured using a cast extrusion line in which the stretch film is extruded onto a cooled cast roller. In accordance with the invention, polymer composition for each layer, as described above, is fed through a blender or hopper to a series of extruders corresponding to each of the compositions. This blend of polymers is fed into 3 or 4 extruders and heated to a molten state in a manner consistent with conventional cast film co-extrusion processes. The stretch film of the invention can be manufactured by feeding polymer compositions for the various layers through the extruders at a combined rate of about 1000 to 5000 lbs./hr. (typical), under the following operating conditions:

| A/D | 375° F.–540° F. | 625–1250 lbs./hr. |
| B Layer | 375° F.–540° F. | max. 2500 lbs./hr. |
| C Layer | 375° F.–540° F. | max. 1250 lbs./hr. |

The molten polymer is then conveyed to a "feed-block" that combines the molten materials and maintains the multi-layered co-extruded structure. The five contiguously extruded layers are deposited onto a cooled casting roll to form the stretch film. The layers, each extruded through a slot die at up to 550° F., come into contact with a cast roll cooled to a temperature within an approximate range of 40° F. to 90° F. A vacuum box and static pinning system is used to pin the melt exiting the die opening to the casting roll. The thickness or gauge of the film, as measured from one planar surface to the other planar surface, can run from 0.50 mils to 1.50 mils. The film is drawn down to the final gauge by varying the ratio of line speed (take-up) to feed speed (extruded). The film is carried downstream through a series of idler rollers to the winder where the film is slit, in line, to the finished product width & length. Film widths can range from 10 to 70 inches. (Width does not include core extension.) Length can range from 1000 to 10,000 feet.

The films of the present invention are used to machine wrap canned goods, food products, paints, and the like, pet supplies, automotive supplies (parts, motor oils, etc.), can liner industry, beverage containers, and beverage bottles. The pre-stretch requirements for these types of products range from 150% to over 200%. The majority of the market requires a pre-stretch of 150%. The gauges for such materials are typically between 0.6 mil to 0.9 mil. The desirable physical properties of these products are good clarity, good puncture and tear resistance (across the web and machine direction). This type of film has the highest memory retention and the customer needs to determine how much to pre-stretch the film based upon the product being wrapped. If too much pre-stretch is applied, the film may "relax" and damage the products.

The above represents part of the products wherein the present invention films are useful. Other stretch wrap applications will be apparent to those skilled in the art.

The multilayer stretch wrap films of the present invention are constructed with at least one polymeric layer comprising a polymer resin having a low polydispersity (mLLDPE). The low polydispersity polymer may be prepared from a partially crystalline polyethylene resin that is a polymer prepared with ethylene and at least one alpha olefin monomer, e.g., a copolymer or terpolymer. The alpha olefin monomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene,1-octene, 1-decene, and 1-dodecene.

The low polydispersity polymer generally has the characteristics associated with an LLDPE material, however it has improved properties as explained more fully below. The low polydispersity polymer defined herein will have a density of from about 0.88 to about 0.94 g/cc, preferably from about 0.88 to about 0.93 g/cc, and more preferably from about 0.88 to about 0.925 g/cc.

The average molecular weight of the copolymer can generally range from about 20,000 to about 500,000, preferably from about 50,000 to about 200,000. The molecular weight is determined by commonly used techniques such as size exclusion chromatography or gel permeation chromatography. The low polydispersity polymer should have a molecular weight distribution, or polydispersity, ($M_w/M_n$, "MWD") within the range of about 1 to about 4, preferably about 1.5 to about 4, more preferably about 2 to about 4, and even more preferably from about 2 to about 3. Such products are well known in the art and are discussed in U.S. Pat. Nos. 5,907,942; 5,907,943; 5,902,684; 5,752,362; 5,814,399; and 5,749,202. All of these patents and all the patents and references cited therein are hereby incorporated by reference in their entirety.

Useful low polydispersity polymers are available from, among others, Dow Chemical Company and Exxon Chemical Company, who are producers of single site or constrained geometry catalyzed polyethylenes. These resins are commercially available as the AFFINITY and EXXACT polyethylenes (see Plastics World, p.33–36, January 1995), and also as the ENHANCED POLYETHYLENE and EXCEED line of resins. The manufacture of such polyethylenes, generally by way of employing a metallocene catalyst system, is set forth in, among others, U.S. Pat. Nos. 5,382, 631, 5,380,810, 5,358,792, 5,206,075, 5, 183,867, 5,124, 418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is incorporated herein by reference in its entirety for the purpose of US prosecution. These catalyst systems and their use to prepare such copolymer materials are also set forth in EP 0 600 425 A1 and PCT applications WO 94/25271 and 94/26816 each of which is also incorporated herein by reference in its entirety for the purpose of US prosecution. The low polydispersity polymers thus produced generally have a crystalline content in excess of at least 10 weight percent, generally in excess of at least 15 weight percent. In some of the tables herein, these products are identified with the small letter "m" in front of the polymer designation, such as mLLDPE.

The above patents and publications generally report that these catalysts contain one or more cyclopentadienyl moieties in combination with a transition metal.

The following components are shown as exemplary products used in each of the layers of the five layer film examples shown below. All the films shown below exhibited improved properties for their indicated field of use and as discussed above.

IT1 is a linear low-density polyethylene (LLDPE) product available from Exxon Chemical, Polymers Group. These products are hexene copolymers having the following typical properties. These products are FDA approved for food contact except for cooking. This product meets the requirements set forth above for the outer layer LLDPE.

| IT1 | | |
|---|---|---|
| Melt Index | ASTM D-1238 (E) | 2.0 g/10 min. |
| Density | | 0.917 g/cc |
| Melting Point | | 255° F. (124° C.) |

Component IT2 is a polyolefin having a narrow molecular weight distribution. These polyethylene and ethylene copolymer products are available from various sources such as Union Carbide Corporation, Unipol Polymers, under the designation Flexomerg® Polyolefins. The product shown in the tables has the following properties. This product meets the requirements set forth above for the outer layer Flexomer.

| IT2 | | |
|---|---|---|
| Density (g/cc) | 0.910 | D 1505 |
| Melt Index (g/10 min.) | 2.5 | D 1238 |
| Vicat Softening Point (° C.) | 82 | D 1525 |

Component IT3 is a polyethylene resin available from various sources such as Dow Chemical Company. The product shown in the tables has the following properties. This product is FDA approved for food contact. This product meets the requirements set forth above for the outer layer mLLDPE. This is also described above as the low polydispersity product.

| IT3 | | |
|---|---|---|
| Density (g/cc) | 0.9150 | D 792 |
| Melt Index (g/10 min) | 3.5 | D 1238 |
| DSC Melting Point | 252° F. (122° C.) | |

Component IT4 is an ethylene-octene-1 copolymer designed for extra stretch performance. This product is available from Dow Chemical Company and exhibits the following properties. This product is FDA approved for food contact. The product is designed to provide increased extensibility and resistance to failure around film flaws with improved puncture resistance. This product meets the requirements set forth above for the inner layer LLDPE for blending with other LLDPE components such as IT1.

| IT4 | | |
|---|---|---|
| Melt Index (g/10 min) | 2.3 | D 1238 |
| Annealed Density (g/cc) | 0.917 | D 792 |
| Melt Flow Ratio | 7.35 | D 1238 |

Component IT5 is an LLDPE designed for blown film applications. These products are ethylene butene copolymers. These products are available from various sources including Exxon Chemical and have the following properties. These products exhibit good tensile and toughness properties. These products are FDA approved for food contact at or below cooking temperatures. This product meets the requirements set forth above for the core layer LLDPE for a blending with other LLDPE products such as IT1.

| IT5 | | |
|---|---|---|
| Melt Index (g/10 min.) | 2.0 | D 1238 |
| Density (g/cc) | 0.918 | |
| Melting point | 249° F. (121° C.) | |

The following products were made in accordance with the present invention. Each of the film products represents general purpose stretch wrap film products for commercial applications. The film products exhibited improved physical properties.

| Stretch Film-I: .60 MIL/15.2 MICRON & LIGHTER | | |
|---|---|---|
| LAYERS | % PER LAYER | RESIN |
| A-12.5% | 40.00% | IT1 |
| | 15.00% | IT2 |
| | 45.00% | IT3 |
| B-25% | 32.50% | IT1 |
| | 48.50% | IT4 |
| | 19.00% | IT3 |
| C-25% | 40.00% | IT1 |
| | 60.00% | IT5 |
| B-25% | 32.50% | IT1 |
| | 48.50% | IT4 |
| | 19.00% | IT3 |
| A or D-12.5% | 40.00% | IT1 |
| | 15.00% | IT2 |
| | 45.00% | IT3 |

| Stretch Film-I: .65 MIL/16.5 MICRON | | |
|---|---|---|
| LAYERS | % PER LAYER | RESIN |
| A-12.5% | 40.00% | IT1 |
| | 15.50% | IT2 |
| | 44.50% | IT3 |
| B-25% | 32.50% | IT1 |
| | 48.50% | IT4 |
| | 19.00% | IT3 |

-continued

Stretch Film-I: .65 MIL/16.5 MICRON

| LAYERS | % PER LAYER | RESIN |
|---|---|---|
| C-25% | 40.00% | IT1 |
|  | 60.00% | IT5 |
| B-25% | 32.50% | IT1 |
|  | 48.50% | IT4 |
|  | 19.00% | IT3 |
| A or D-12.5% | 40.00% | IT1 |
|  | 15.50% | IT2 |
|  | 44.50% | IT3 |

Stretch Film-I: .70 MIL/17.8 MICRON

| LAYERS | % PER LAYER | RESIN |
|---|---|---|
| A-12.5% | 40.00% | IT1 |
|  | 16.00% | IT2 |
|  | 44.00% | IT3 |
| B-25% | 32.50% | IT1 |
|  | 48.50% | IT4 |
|  | 19.00% | IT3 |
| C-25% | 40.00% | IT1 |
|  | 60.00% | IT5 |
| B-25% | 32.50% | IT1 |
|  | 48.50% | IT4 |
|  | 19.00% | IT3 |
| A or D-12.5% | 40.00% | IT1 |
|  | 16.00% | IT2 |
|  | 44.00% | IT3 |

Stretch Film-I: .75 MIL/19.0 MICRON

| LAYERS | % PER LAYER | RESIN |
|---|---|---|
| A-12.5% | 39.50% | IT1 |
|  | 16.50% | IT2 |
|  | 44.00% | IT3 |
| B-25% | 32.50% | IT1 |
|  | 48.50% | IT4 |
|  | 19.00% | IT3 |
| C-25% | 40.00% | IT1 |
|  | 60.00% | IT5 |
| B-25% | 32.50% | IT1 |
|  | 48.50% | IT4 |
|  | 19.00% | IT3 |
| A or D-12.5% | 39.50% | IT1 |
|  | 16.50% | IT2 |
|  | 44.00% | IT3 |

Stretch Film-I: .80 MIL/20.3 MICRON

| LAYERS | % PER LAYER | RESIN |
|---|---|---|
| A-12.5% | 40.00% | IT1 |
|  | 17.00% | IT2 |
|  | 43.00% | IT3 |
| B-25% | 32.50% | IT1 |
|  | 48.50% | IT4 |
|  | 19.00% | IT3 |
| C-25% | 40.00% | IT1 |
|  | 60.00% | IT5 |
| B-25% | 32.50% | IT1 |
|  | 48.50% | IT4 |
|  | 19.00% | IT3 |

Stretch Film-I: .80 MIL/20.3 MICRON

| LAYERS | % PER LAYER | RESIN |
|---|---|---|
| A or D-12.5% | 40.00% | IT1 |
|  | 17.00% | IT2 |
|  | 43.00% | IT3 |

Stretch Film-I: .85 MIL/21.6 MICRON

| LAYERS | % PER LAYER | RESIN |
|---|---|---|
| A-12.5% | 38.50% | IT1 |
|  | 18.50% | IT2 |
|  | 43.00% | IT3 |
| B-25% | 32.50% | IT1 |
|  | 48.50% | IT4 |
|  | 19.00% | IT3 |
| C-25% | 40.00% | IT1 |
|  | 60.00% | IT5 |
| B-25% | 32.50% | IT1 |
|  | 48.50% | IT4 |
|  | 19.00% | IT3 |
| A or D-12.5% | 38.50% | IT1 |
|  | 18.50% | IT2 |
|  | 43.00% | IT3 |

Stretch Film-I: .90 MIL/22.9 MICRON

| LAYERS | % PER LAYER | RESIN |
|---|---|---|
| A-12.5% | 38.00% | IT1 |
|  | 19.00% | IT2 |
|  | 43.00% | IT3 |
| B-25% | 32.50% | IT1 |
|  | 48.50% | IT4 |
|  | 19.00% | IT3 |
| C-25% | 40.00% | IT1 |
|  | 60.00% | IT5 |
| B-25% | 32.50% | IT1 |
|  | 48.50% | IT4 |
|  | 19.00% | IT3 |
| A or D-12.5% | 38.00% | IT1 |
|  | 19.00% | IT2 |
|  | 43.00% | IT3 |

Stretch Film-I: 1.0 MIL/25.4 MICRON & HEAVIER

| LAYERS | % PER LAYER | RESIN |
|---|---|---|
| A-12.5% | 37.00% | IT1 |
|  | 20.00% | IT2 |
|  | 43.00% | IT3 |
| B-25% | 32.50% | IT1 |
|  | 48.50% | IT4 |
|  | 19.00% | IT3 |
| C-25% | 40.00% | IT1 |
|  | 60.00% | IT5 |
| B-25% | 32.50% | IT1 |
|  | 48.50% | IT4 |
|  | 19.00% | IT3 |
| A or D-12.5% | 37.00% | IT1 |
|  | 20.00% | IT2 |
|  | 43.00% | IT3 |

As can be seen from the above, the five layer film comprises two outer layers, two inner layers, and a core layer. The outer layers comprise from about 5–20 percent of the overall film. The outer layers may be the same or different. It is preferred that the outer layers are blends of products to achieve the desired results. The inner layers (as distinguished from the core layer) comprise from about 20–35% of the overall film. The inner layers may be the same or different. The core layer comprises from about 15–30% of the overall film.

The table below shows the physical properties of the 0.80 mil film shown above and produced in accordance with the present invention.

| TENSILE | Tensile @ Yield (PSI) | |
|---|---|---|
| Point at which film no longer behaves like a spring. | MD | 1045 |
| | *MD @ 200% | 1528 |
| | TD | 1058 |
| ULTIMATE TENSILE (psi) | MD | 6827 |
| Maximum Tensile Stress (Before breaking point) | TD | 4407 |
| ELONGATION @ YIELD % | MD | 7.6 |
| Increase in length at yield point. | TD | 7.4 |
| BREAK ELONGATION (%) | MD | 631 |
| Increase in length @ break point. (Higher number-greater stretch. | TD | 902 |
| 1% SECANT MODULUS (psi) | MD | 18859 |
| Measure of stiffness. | TD | 19348 |
| ELMENDORF TEAR | MD (g) | 255 |
| Force required to tear film. | MD (g/mil) | 311 |
| | TD (g) | 689 |
| | TD (g/mil) | 844 |
| DART DROP | (g) | 152 |
| Measure of impact resistance. | (g/mil) | 191 |
| GUAGE MIC (mils) | Average | 0.78 |
| Thickness of film. | Low | 0.76 |
| | High | 0.81 |
| PUNCTURE | Starting Prestretch % | 245 |
| Length of probe at 200%. | 9 INCH | P |
| LOAD RETENTION | Starting Prestretch % | 200 |
| Holding force. | POUNDS | 26 |
| CLING | Starting Prestretch % | 275 |
| Measure of cling force. | | 141 |
| PRE-STRETCH | Average % | 413 |
| Measure of stretch % before break occurs. | Starting % | 325 |
| | Stretchforce (lbs) | 37 |

When compared to standard three layer films, the five layer films of the present invention exhibit improved break elongation, Elmendorf Tear and pre-stretch values. In addition, a film of the present invention exhibits a good balance of properties for the targeted applications.

While various examples have bee given above to assist the illustration of the present invention, these examples are not intended to define the scope of the invention. As is clear to the person skilled in the art, various products and combinations of products are utilized in each of the layers within the limitations of the claims below.

What is claimed is:

1. A multi-layer film comprising at least
   a first outer layer comprising a blend of linear low density polyethylene, a metallocenes catalyzed linear low density polyethylene, and a flexible very low density polyethylene;
   a first inner layer comprising a blend of linear low density polyethylene and a metallocenes catalyzed linear low dety polyethylene;
   a core layer comprising linear tow density polyethylene;
   a second inner layer comprising a blend of linear low density polyethylene and a metallocenes catalyzed linear low density polyethylene; and
   a second outer layer comprising a blend of linea low density polycthylene, a metallocenes catalyzed linear low density polyethylene, and a flexible very low density polyethylene.

2. The multi-layer film of claim 1 where each of the linear low density polyethylene in each of the layers is the same.

3. The multi-layer film of claim 2 where 20 to 40 percent of the weight of each layer comprises the same linear low density polyethylene.

4. A multi-layer film comprising at least
   from 8 to 25 percent by weight of the film of a first outer layer comprising a blend of linear low density polyethylene, a metallocenes catalyzed linear low density polyethylene, and a flexible very low density polyethylene;
   from 15 to 35 percent by weight of the film of a first inner layer comprising a blend of linear low density polyethylene and a metallocenes catalyzed linear low density polyethylene;
   from 15 to 35 percent by weight of the film of a core layer comprising linear low density polyethylene;
   from 15 to 35 percent by weight of the film of a second inner layer comprising a blend of linear low density polyethylene and a metallocenes catalyzed linear low density polyethylene; and
   from 8 to 25 percent by weight of the film of a second outer layer comprising a blend of linear low density polyethylene, a metallocenes catalyzed linear low density polyethylene, and a flexible very low density polyethylene.

5. The multi-layer film of claim 4 where each of the linear low density polyethylene in each of the layers is the same.

6. The multi-layer film of claim 6 where 20 to 40 percent of the weight of each layer comprises the same linear low density polyethylene.

7. A multi-layer film comprising
   from 8 to 25 percent by weight of the film of a first outer layer comprising a blend of 20 to 60 print by weight of the layer of a linear low density polyethylene, 25 to 65 percent by weight of the layer of a metallocenes catalyzed linear low density polyethylene, and 10 to 30 percent by weight of the layer of a flexible very low density polyethylene;
   from 15 to 35 percent by weight of the film of a first inner layer comprising a blend of 70 to 90 percent by weight of the layer of linear low density polyethylene and from 10 to 30 percent by weight of the layer of a metallocenes catalyzed linear low density polyethylene;
   from 15 to 35 percent by weight of the film of a core layer comprising linear low density polyethylene; from 15 to 35 percent by weight of the film of a second inner layer comprising a blend of 70 to 90 percent by weight of the layer of linear low density polyethylene and from 10 to 30 percent by weight of the layer of a metallocenes catalyzed linear low density polyethylene; and
   from 9 to 25 percent by weight of the film of a second outer layer comprising a blend of 20 to 60 percent by weight of the layer of a linear low density polyethylene, 25 to 65 percent by weight of the layer of a metallocenes catalyzed linear low density polyethylene, and 10 to 30 percent by weight of the layer of a flexible very low density polyethylene.

8. The multi-layer film of claim 7 where each of the linear low density polyethylene in each of the layers is the same.

9. The multi-layer film of claim 7 wherein the core layer linear low density polyethylene comprises a blend of a linear low density polyethylene-hexene copolymer and a linear low density polyethylene butene copolymer.

10. The multi-layer film of claim 9 wherein the core layer linear low density polyethylene comprises a blend of from 10 to 90 percent by weight of the core layer of a linear low density polyethylene hexene copolymer, and from 10 to 90 percent by weight of the core layer of a linear low density polyethylene butene copolymer.

11. The multi-layer film of claim 7 wherein the linear low density polyethylene of the first and second inner layers each comprises a blend of at a linear low densely polyethylene hexene copolymer and a linear low density polyethylene octene copolymer.

12. The multi-layer film of claim 11 wherein the linear low density polyethylene of the first inner layer and the second inner layer comprises a blend of from 20 to 40 percent by weight of the layer of a linear low density polyethylene hexene copolymer, and from 35 to 60 percent by weight of a layer of a linear low density polyethylene octene copolymer.

13. A multi-layer film comprising
- a first outer layer repressing form 8 to 25 percent by weight of the film and comprising a blend of
  - 20 to 60 percent by weight of the layer of a linear low density polyethylene hexene copolymer,
  - 25 to 65 percent by weight of the layer of a metallocenes catalyzed linear low density polyethylene octene copolymer, and
  - 10 to 30 percent by weight of the layer of a flexible very low density polyethylene;
- a first inner layer representing from 15 to 35 percent by weight of the film and comprising a blend of
  - from 20 to 40 percent by weight of the layer of a linear low density polyethylene hexene copolymer,
  - from 35 to 60 percent by weight of the layer of a linear low density polyethylene octene copolymer, and
  - from 10 to 30 percent by weight of the layer of a metallocenes catalyzed linear low density polyethylene;
- a core layer representing from 15 to 35 percent by weight of the film comprising a blend of
  - from 10 to 90 percent by weight of the layer of a linear low density polyethylene hexene copolymer, and
  - from 10 to 90 percent by weight of the layer of a linear low density polyethylene butene copolymer;
- a second inner layer representing from 15 to 35 percent by weight of the film and comprising a blend of
  - from 20 to 40 percent by weight of the layer of a linear low density polyethylene hexem copolymer,
  - from 35 to 60 percent by weight of the layer of a linear low density polyethylene octene copolymer, and
  - from 10 to 30 percent by weight of he layer of a metallocenes catalyzed linear low density polyethylene; and
- a second outer layer representing from 8 to 25 percent by weight of the film and comprising a blend of
  - 20 to 60 percent by weight of the layer of a linear low density polyethylene hexene copolymer,
  - 25 to 65 percent by weight of the layer of a metallocenes catalyzed linear low density polyethylene octane copolymer, and
  - 10 to 30 percent by weight of the layer of a flexible very low density polyethylene.

14. The multi-layer film of claim 13 wherein the linear low density polyethylene hexene copolymer in each layer is the same polymer and wherein the linear low density polyethylene hexene copolymer has a melt index from 1.5 to 2.5 g/10 min. has a melt index from 1.5 to 2.5 g/10 min. and a density of from 0.915 to 0.9198 grams per cubic centimeter.

* * * * *